US006977115B1

(12) United States Patent
Wilson

(10) Patent No.: US 6,977,115 B1
(45) Date of Patent: Dec. 20, 2005

(54) LOW PRESSURE COMPRESSION MOLDED PARTS HAVING NANO-PARTICLE REINFORCED PROTRUSIONS AND METHOD OF MAKING THE SAME

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/868,945

(22) PCT Filed: Dec. 17, 1999

(86) PCT No.: PCT/US99/29992

§ 371 (c)(1),
(2), (4) Date: Jun. 21, 2001

(87) PCT Pub. No.: WO00/37243

PCT Pub. Date: Jun. 29, 2000

Related U.S. Application Data

(60) Provisional application No. 60/113,133, filed on Dec. 21, 1998.

(51) Int. Cl.[7] ............................. B32B 5/16; C08K 3/24; B29B 9/00
(52) U.S. Cl. ...................... 428/331; 524/445; 524/447; 524/52; 264/5; 428/323
(58) Field of Search ................................ 428/156, 172, 428/85, 323, 331, 325, 411.1, 425.1, 454; 442/394, 286; 264/5; 524/445, 447, 52

(56) References Cited

U.S. PATENT DOCUMENTS

| 3,497,409 | A | | 2/1970 | Clem |
| 4,447,488 | A | * | 5/1984 | Simm et al. ................. 428/213 |
| 4,572,856 | A | | 2/1986 | Gembinski |
| 4,739,007 | A | | 4/1988 | Okada et al. |
| 4,945,682 | A | | 8/1990 | Altman et al. |
| 5,239,406 | A | | 8/1993 | Lynam |
| 5,552,469 | A | | 9/1996 | Beall et al. |
| 5,576,372 | A | | 11/1996 | Kresge et al. |
| 5,576,373 | A | | 11/1996 | Kresge et al. |
| 5,591,289 | A | | 1/1997 | Souders et al. |
| 5,624,619 | A | | 4/1997 | Pelzer |

(Continued)

FOREIGN PATENT DOCUMENTS

CA    2142764    8/1995

(Continued)

OTHER PUBLICATIONS

Porter et al. Journal of Polymer Science: Part B: Polymer Physics—"Inorganic/Organic Host-Guest Materials: Surface and Interclay Reactions of Styrene with Cooper (II)-Exchanged Hectorite"; vol. 36, 673-679, Mar. 1998.

(Continued)

Primary Examiner—Terrel Morris
Assistant Examiner—Lynda M. Salvatore
(74) Attorney, Agent, or Firm—Pillsbury Winthrop Shaw Pittman LLP

(57) ABSTRACT

A reinforced molded article having reinforced protrusions extending from the surface of the article is suitable for molding into automobile trim. The article comprises at least one thermoplastic; about 2% to about 15% by volume reinforcing particles having one or more layers of 0.7 nm–1.2 nm thick platelets, wherein more than about 50% of the reinforcing particles are less than about 20 layers thick; whereby the reinforcing particles reinforce a protrusion from the surface of the molded article, the protrusion having a thickness of less than 1/10 inch. A method of producing reinforced articles comprising this reinforced protrusion is also disclosed.

5 Claims, 4 Drawing Sheets

U.S. PATENT DOCUMENTS

| | | |
|---|---|---|
| 5,626,704 A | 5/1997 | Bowers, Jr. et al. |
| 5,643,998 A | 7/1997 | Nakano et al. |
| 5,652,284 A | 7/1997 | Eidt, Jr. et al. |
| 5,660,428 A | 8/1997 | Catlin |
| 5,665,183 A | 9/1997 | Kresge et al. |
| 5,672,397 A | 9/1997 | Bowers, Jr. et al. |
| 5,688,866 A | 11/1997 | Silvis et al. |
| 5,693,710 A | 12/1997 | Srinivasan et al. |
| 5,698,624 A | 12/1997 | Beall et al. |
| 5,705,222 A | 1/1998 | Somasundaran et al. |
| 5,712,003 A | 1/1998 | Suenaga et al. |
| 5,716,560 A | 2/1998 | Heuchert et al. |
| 5,717,000 A | 2/1998 | Karande et al. |
| 5,728,443 A | 3/1998 | Bowers, Jr. et al. |
| 5,728,465 A | 3/1998 | Dorfman et al. |
| 5,733,644 A | 3/1998 | Tanaka et al. |
| 5,741,860 A | 4/1998 | Matsumoto et al. |
| 5,743,983 A | 4/1998 | Ogata et al. |
| 5,747,560 A | 5/1998 | Christiani et al. |
| 5,750,062 A | 5/1998 | Tsukamoto |
| 5,750,600 A | 5/1998 | Nozokido et al. |
| 5,883,173 A | 3/1999 | Elspass et al. |

FOREIGN PATENT DOCUMENTS

| | | |
|---|---|---|
| DE | 19625797 A1 | 10/1986 |
| EP | 0 352 042 B1 | 3/1995 |
| EP | 0 437 096 B1 | 9/1996 |
| WO | WO 93/11190 | 6/1993 |
| WO | WO 94/22680 | 10/1994 |
| WO | WO 99/61236 | 12/1999 |
| WO | WO 99/61237 | 12/1999 |
| WO | WO 99/61281 | 12/1999 |
| WO | WO 99/61287 | 12/1999 |

OTHER PUBLICATIONS

Hasegawa et al. Journal of Applied Polymer Science—"Preparation and Mechanical Properties of Polypropylene-Clay Hybrids Using a Maleic Anhydride-Modified Polypropylene Oligomer"; vol. 67, 87-92, Jan. 3, 1998.

Ou et al. Journal of Polymer Science: Part B: Polymer Physics—A New Conception on the Toughness of Nylon 6/Silica Nanocomposite Prepared via In Situ Polymerization; vol. 36, 789-795, Apr. 15, 1998.

Modern Plastics, "Nanocomposites showing promise in automotive and packaging roles", Feb. 1998, pp. 26-28.

Abstract-JP9316119A: "Olefin Polymerization Catalyst and Polymerization of Olefin Using the Same".

Abstract-JP8027339A: "Heat Resistant Vinyl Chloride Resin Composition".

Abstract-JP8127089A: "Multilayered Plastic Fuel Tank".

Abstract-JP9048896A: "Vinyl Chloride-Based Resin Composition for Powder Molding".

Abstract-JP9048897A: "Vinyl Chloride-Based Resin Composition for Powder Molding".

Abstract-JP9067493A: "Chenille Under Door".

Abstract-JP9077943A: "Vinyl Chloride Resin Composition for Paste".

Abstract-JP9137019A: "Vinyl Chloride Resin Composition".

Abstract-JP9302180A: "Vinyl Chloride Resin Composition for Powder Molding".

Abstract-JP 10060037A: "Catalyst for Polymering Olefin and Polymerization of Olefin in Presence of the Catalyst".

Abstract-JP 2029457A: "High-Rigidity and High-Impact Polyamide Resin Composition".

Abstract-JP2166157A: "Resin Composition".

Abstract-JP2208357A: "Material for Automotive Trim".

Abstract-JP2208358A: "Highly Rigid and Heat-Resistant Polyamide Resin Composition".

Abstract-JP2240160A: "Material for Part in Automotive Engine Room".

Abstract-JP3024155A: "Polyamide Blow Molding Material".

Abstract-JP3215556A: "Resin Composition".

Abstract-JP3215557A: "Resin Composition".

Abstract-JP4180965A: "Preparation of Modified Composite Material".

Abstract-JP4305444A: "Foamed Sheet Material and Preparation Thereof".

Abstract-JP5293916A: "Multilayer Fuel Tube for Automobile".

Abstract-JP63132933A: "Thermotropic Liquid Crystal Copolyester".

Abstract-JP7324160A: "Polyphenylene Ether Resin Composition".

* cited by examiner

LOW PRESSURE COMPRESSION MOLDED PARTS HAVING NANO-PARTICLE REINFORCED PROTRUSIONS AND METHOD OF MAKING THE SAME

CROSS-REFERENCE TO RELATED APPLICATIONS

This application is the National Phase of International Application No. PCT/US99/29992, filed on Dec. 17, 1999, which in turn claims priority to Provisional Patent Application No. 60/113,133, filed on Dec. 21, 1998, the contents of all of which are hereby incorporated by reference.

GOVERNMENTAL SUPPORT AND INTEREST

The invention in this patent was made with Governmental support under Cooperative Agreement No. 70NANB7H3028 awarded to the Dow Chemical Company and Decoma International of America, Inc. (formerly Magna International of America, Inc.), project ID 199-02-0047B, project name "NANOCOMPOSITES—NEW LOW COST/HIGH STRENGTH MATERIALS FOR AUTOMOTIVE PARTS", awarded Sep. 30, 1997 by the United States Department of Commerce, National Institute of Standards and Technology, Advanced Technology Program. The Government has certain rights in this invention.

BACKGROUND OF THE INVENTION

Automobile interior trim is often engineered to minimize wall thickness, while maintaining desired structural characteristics. Greater wall thickness of such molded articles requires more raw material per unit part, thereby undesirably increasing the cost of production and increasing vehicle weight. Furthermore, greater wall thicknesses slow down production time due to longer cycling periods needed to permit cooling of thicker molded regions.

Automotive trim components or articles, such as interior panels are often molded from thermoplastic to have various protrusions extending from a broad panel surface, which protrusions serve different functions. For example, some trim components are provided with stiffening ribs to reduce twisting or flexing of the part. The same or other trim components may be provided with fastening bosses that add rigidity and/or strength to areas of the part that are to be secured or fastened to another structure. For example, a screw receiving hole in a molded article may be surrounded by an annular protrusion for support. Such annular protrusion may also have radially outwardly extending protrusions (as an asterisk) to provide further support. As another example, standoffs may be formed on the broad surface of the part to provide proper spacing from an abutting component. As a further example, a protrusion may be in the form of a dog house or cage, which is used to secure the article or trim component to some other part, e.g., by a hook.

Because it is desirable to manufacture automotive parts with the least amount of material as possible, without sacrificing performance, it is desirable to make the types of protrusions mentioned above as small as possible, so long as they achieve their intended function. Oftentimes, it is desirable to make the protrusions with a thickness of $\frac{1}{10}$" or less (i.e., measured in a direction parallel to the surface from which the protrusion protrudes and perpendicular to the longitudinal direction of the protrusion).

It can be appreciated that protrusions of such narrow cross section may be subject to chipping or breakage. As the protrusion protrudes further from the base surface, it becomes more prone to breakage. In addition, several of such protrusions are of a tapered configuration terminating in a relatively narrow pointed tip. Such tip is often less than $\frac{1}{10}$" thick and is highly prone to chipping.

Of course, almost all thermoplastic automotive trim components are reinforced by reinforcement materials. More specifically, it is known to use glass fibers to reinforce thermoplastic trim components. Such glass fibers typically have a length on the order of about $\frac{1}{8}$". When glass-reinforced thermoplastic materials are molded in high pressure injection molding operations (e.g., of pressure levels greater than 15,000 PSI), movement of the molten material, for example, through a gate and runner system, causes the glass fibers to align themselves longitudinally with the longitudinal or longer extent of the projection. In this manner, even though the glass fibers have a length greater than the thickness of the protrusions, the thickness or width of the aligned fibers (typically about 6–20 microns) will fit into the protrusions to reinforce the protrusions adequately.

However, for certain applications, it is desirable to mold the thermoplastic articles in a low pressure compression molding method (e.g., less than 3,000 PSI). In such method, molten thermoplastic is introduced into a cavity. The mold is then closed, and excess material is squeezed between the die surfaces so that the molten material fills all gaps and shapes to form the part. The part can thus be finished in a one-step process.

One drawback with the conventional low pressure compression molding methods, however, is that where a pan is to be highly reinforced, e.g., requiring 25–35% by volume glass fibers, the glass reinforcement fibers inhibit substantial flow of molten material. As a result, the fibers do not align with the longitudinal direction of the protrusions, and an insufficient amount of glass fibers will enter into protrusions of thicknesses of $\frac{1}{10}$" or less. Thus, these protrusions would need to be made thicker, or otherwise not be reinforced to the extent desirable.

It is an object of the invention to provide a highly reinforced molded part that can be provided with equally reinforced protrusions of a thickness less than 0.1". In order to achieve this object and to overcome the problems noted above, the present invention provides a reinforced molded article comprising a main portion which has opposing major surfaces defining a thickness of the main portion. A protrusion is integrally molded with the main portion and protrudes from one of the surfaces, the protrusion having a thickness of less than the thickness of the main portion and less than about 0.1". The protrusion has a height of at least twice the thickness of the protrusion. The main portion and the protrusion are formed from a material comprising at least one thermoplastic, and about 2% to about 15%, by volume, of reinforcing particles. The particles each comprise one or more layers, wherein at least 50% of the reinforcing particles are less than about 20 layers thick, at least 99% of the reinforcing particles are less than about 30 layers thick, and the layers comprise platelets having a thickness of between about 0.7 nm and 1.2 nm.

It is a further object of the invention to provide a method of manufacturing a highly reinforced molded part that has the equally reinforced protrusions as discussed above. In accordance with this object, the present invention provides a method of producing a reinforced article comprised of a main portion which has opposing major surfaces defining a thickness of the main portion. A protrusion is integrally molded with the main portion and protrudes from one of the surfaces, the protrusion having a thickness of less than the thickness of the main portion and less than about 0.1". The protrusion has a height of at least twice the thickness of the protrusion. The method prepares a melt of at least one thermoplastic, and about 2% to about 15%, by volume, of reinforcing particles. The particles each comprise one or more layers. At least 50% of the reinforcing particles are less than about 20 layers thick, at least 99% of the reinforcing particles are less than about 30 layers thick, and the layers comprise platelets having a thickness of between about 0.7 nm and 1.2 nm. The melt is compressed between die surfaces at a pressure of less than 3,000 PSI, the die surfaces having recesses corresponding to the shape of the protrusions and receiving the melt, including the 2%–15% by volume reinforcing particles, in the recesses so that the melt conforms to the shape of the recesses. The melt is cooled, and the cooled portions of the melt that are received in the recesses form the reinforced protrusions.

These and other objects of the invention can be more fully appreciated from the following detailed description of the preferred embodiments.

BRIEF DESCRIPTION OF THE DRAWINGS

A preferred embodiment of the present invention is described herein with reference to the drawings wherein.

DETAILED DESCRIPTION OF THE PREFERRED EMBODIMENTS

Figure 1:
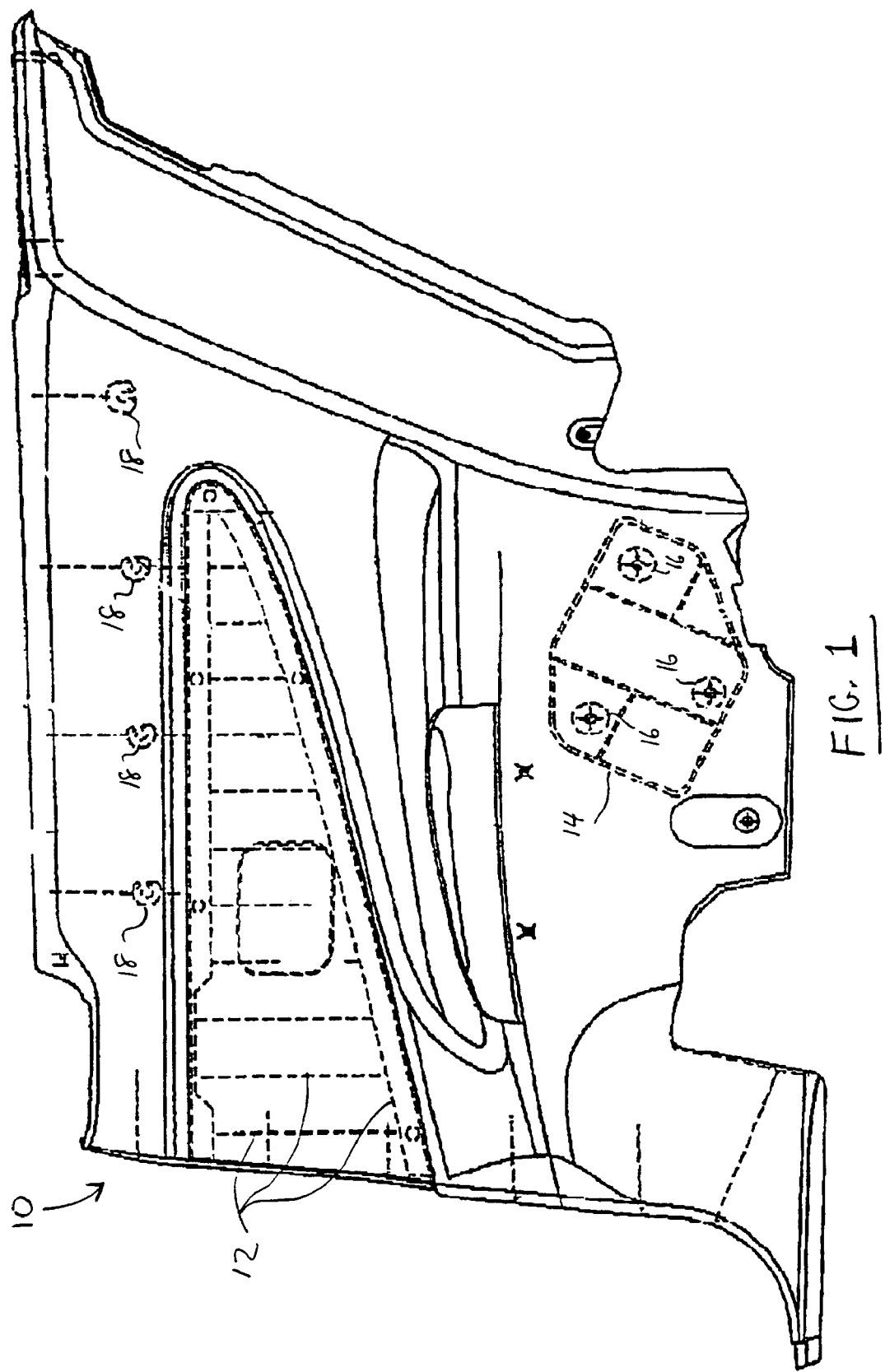
FIG. 1 is a front elevation view of an inner door panel for a motor vehicle manufactured in accordance with the principles of the present invention.

Shown in FIG. 1, is an inner door panel for a motor vehicle, generally indicated at 10, and used to exemplify certain applications of the present invention. In FIG. 1, several projections are illustrated schematically by the use of dashed lines.

For example, a plurality of stiffening ribs 12 are shown to add stiffness and rigidity to the panel 10, to inhibit bending, flexing or twisting of the panel. Also illustrated are an array of projections 14, which are used as structural supports for mounting a stereo speaker. This same region is provided with a plurality of bosses 16, which provide supported or reinforced holes through the panel 10, which hold or receive fasteners for affixing the speaker to the panel 10. Also shown are a plurality of dog houses (also known as "cages") 18, known in the art to be used for securing other structures to the panel 10.

Figure 2:
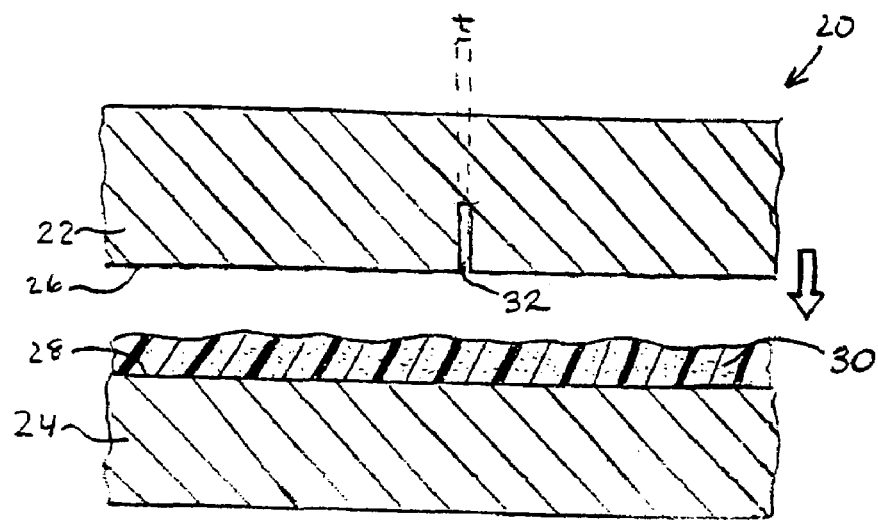
FIG. 2 is a cross sectional view of a compression molding die assembly used in accordance with the method of the present invention.

FIG. 2 is a partial cross-sectional view taken through a compression molding apparatus used to form the articles in accordance with the present invention. The apparatus, generally indicated at 20, includes a first die structure 22 and a second die structure 24. The die structures 22 and 24 have interior die surfaces 26 and 28, respectively, defining the shape of a die cavity corresponding to the shape of the article to be molded.

A plastic melt 30, to be described in greater detail later, is deposited between the die surfaces 26 and 28 (e.g., on the lower die surface 28 as illustrated in FIG. 2).

The surface 26 of the first die structure 22 defines a recess 32, which recess is used to form projections in accordance with the present invention.

After the melt 30 is provided between the die surfaces 26, 28, the die surfaces are moved towards one another (e.g., by moving die structure 22 downwardly towards die structure 24). Typically, peripheral portions of the die structures 22, 24 are brought into engagement with one another, leaving a die cavity between the central portions of die structures 22, 24. A sufficient amount of plastic melt 30 is provided between the die structures 22, 24 to fill the entire cavity completely, including any recesses 32, which are used to form the projections in accordance with the present invention.

It should be appreciated that the present invention concerns applications wherein a projection which is to be formed as a wall thickness of 0.1" or less. Therefore, it should be appreciated that the thickness (t) of the recess 32, which forms the projection in accordance with the present invention, should also be less than 0.1" thick.

In the compression molding method, any excess plastic material 30 is controllably squeezed out from between the surfaces 26, 28 and the die cavity into receiving ports. The die cavity is maintained at pressures less than 3,000 PSI during the molding operation.

Figure 3:
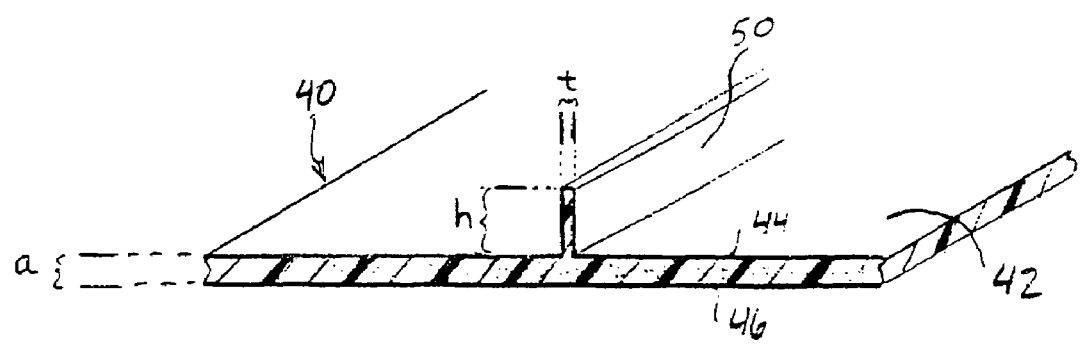
FIG. 3 is a perspective view, partly in cross-section, of a reinforced article manufactured in accordance with the principles of the present invention.

FIG. 3 is a partial perspective view, partly in section, of an article 40 manufactured in accordance with the present invention. For example, this article 40 may be the door panel 10 illustrated in FIG. 1. As shown in FIG. 3, the article 40 comprises a main portion 42 having opposing major surfaces 44 and 46. Preferably, surfaces 44 and 46 are substantially parallel to one another. The surfaces 44 and 46 define a thickness (a) of the main portion 42. A protrusion 50 (e.g., which may form a stiffening rib 12 in FIG. 1) is integrally molded with the main portion 42 and protrudes from surface 44. The protrusion 50 has a thickness (t), which is less than the thickness (a) of the main portion 42. In addition, the thickness (t) is less than about 0.1". The protrusion 50 has a height (h) of at least twice the thickness (t) of the protrusion. The height (h) is at least twice the thickness (a) of the main portion 42.

As will be described in greater detail, the plastic melt 30, and hence, the integrally molded main portion 42 and protrusion 50 (shown in FIG. 3 after being removed from the die structure 20 and cooled), are formed from a material comprising at least one thermoplastic, and about 2% to about 15% by volume of reinforcing particles. The reinforcing particles each comprise one or more layers, and at least 50% of the reinforcing particles are less than about 20 layers thick. The layers comprise platelets having a thickness of between about 0.7 nm–1.2 nm.

It is desirable for the thickness (t) of the protrusion 50 to be thinner than the main portion 42 so as to avoid the occurrence of a sink forming on the opposite surface 46 in the region thereof opposite the protrusion 50. The occurrence of this sink may occur during cooling of the material 30 where the protrusion 50 comprises a significant amount of material and would therefore shrink to a significant extent, drawing material from the main portion 42 during cooling. It is preferred for the thickness (t) of the protrusion 50 to have a thickness of less than 80% of the thickness (a) of the main portion 42.

In order for the protrusion 50 to provide a sufficient amount of support for the main portion 42, the height (h) is at least twice the thickness (a) of the base portion 42.

Preferably, the minimum thickness (a) of the base portion 42 is 0.065". Therefore, the minimum height (h) of the protrusion 50 is about 0.130".

It should be appreciated, however, that the dog houses (or cages) 18 in FIG. 1 can comprise projections over 1" in height. The cylindrical sleeves of the screw bosses 16 are preferably between ¼" to 1" in height.

Preferably, the height (h) of the protrusion 50 is between 2 times to 30 times the thickness (t) of the protrusion 50.

Irrespective of the fact that the thickness (t) of the protrusion 50 is less than 0.1", it is nevertheless reinforced to the same extent as the main portion 42, and to a greater extent than would be possible with high glass fiber loading. This is due to the particular nature of the molded material 30 used in accordance with the present invention as described below.

The articles (and the plastic melt from which the articles are molded) comprise a composite material of a polymer having dispersed therein reinforcement fillers in the form of very small mineral reinforcement particles. The reinforcement filler particles, also referred to as "nanoparticles" due to the magnitude of their dimensions, each comprise one or more essentially flat platelets. Generally, each platelet has a thickness of between about 0.7–1.2 nanometers. The average platelet thickness is approximately 1 nanometer.

The preferred aspect ratio of the reinforcement particles, which is the largest dimension of a particle divided by the thickness of the particle, is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably at least 90% of the panicles have an aspect ratio within the 100–200 range.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadite, and kenyaite. Mixed Mg and Al hydroxides may also be used. Various other clays can be used, such as claytone H.Y. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The polymer composites of the present invention are prepared by combining the platelet mineral with the desired polymer in the desired ratios. The components can be blended by general techniques known to those skilled in the art. For example, the components can be blended and then melted in mixers or extruders. The ratios will be determined based on, for example, desired dimensional stabilization and/or desired mechanical properties of the final molded article.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background, the following are also incorporated by reference: U.S. Pat. Nos. 4,739,007 and 5,652,284.

Generally, compression molding processes are preferred for certain high volume production of reinforced plastics. Automotive interior trim parts produced by low pressure compression molding can be very complex with fine detail and close dimensional tolerance. Thus, thin, reinforced molded-in inserts for screws, bearings, or other attachments in automotive trim may be produced by compression molding according to the invention. Reinforced bosses or other hollow circular standoffs into which a screw can be thread may be made as well. Reinforced bosses having small ribs for even greater reinforcement are also contemplated according to the invention. Stiffening ribs may be integrally molded into automobile interior trim according to the invention. Ribs forming hooks may be reinforced according to the invention. All such integrally molded, reinforced protruding elements have a thickness of less than ¹⁄₁₀ inch and extend from a primary trim portion or body.

Typical resins used in low pressure compression molding include nylon, polypropylene, thermoplastic polyester and polycarbonate. The process permits use of recycled materials, such as scrap polyolefins. Preferably, the thermoplastic used in the present invention is a polyolefin or a homogenous or copolymer blend of polyolefins. The preferred polyolefin is at least one member selected from the group consisting of polypropylene, ethylene-propylene copolymers, thermoplastic olefins (TPOs), and thermoplastic polyolefin elastomers (TPEs). For high performance applications, engineering thermoplastics are most preferred. Such engineering thermoplastic resins may include polycarbonate (PC), acrylonitrile butadiene styrene (ABS), a PC/ABS blend, polyethylene terephthalates (PET), polybutylene terephthalates (PBT), polyphenylene oxide (PPO), or the like.

The exfoliation of layered mineral particles into constituent layers need not be complete in order to achieve the objects of the present invention. The present invention contemplates that more than 50% of the particles should be less than about 20 nanometers in thickness. Otherwise stated, more than about 50% of the particles should be less than about 20 platelets stacked upon one another in the thickness direction. In addition, at least 99% of the particles should have a thickness of less than about 30 layers. Preferably, at least 90% of the particles should have a thickness of less than about 5 layers. It is most preferable to have as many particles as possible to be as small as possible, ideally including only a single platelet. Particles having more than 30 layers may behave as stress concentrators and are preferably avoided, to the extent possible.

Generally, in accordance with the present invention, each of the automotive parts that can be manufactured in accordance with the principles of the present invention should contain nanoparticle reinforcement in amounts less than 15% by volume of the total volume of the part. The balance of the part is to comprise an appropriate thermoplastic material and optionally, suitable additives. If greater than 15% by volume of reinforcement filler is used, the viscosity of the composition becomes higher than what is desirable for molding. Preferably, the amount of reinforcing nanoparticles is greater than 2% by volume, as lower amounts would not achieve the desired increase in strength.

Preferably, relatively rigid compression molded trim parts having thin protrusions comprise reinforcement particles of the type described herein at about 2–15% of the total volume of the part, with the balance comprising the thermoplastic substrate. It is even more preferable for these interior panels to have reinforcement particles of the type contemplated herein comprising about 3%–8% of the total volume of the part. For some applications, inclusion of about 3%–5% by volume reinforcing nanoparticles is optimal.

When about 90% of the nanoparticles in the composition are less than 5 nm in thickness, a more preferred uniform distribution of the particles occurs in the resin, which translates into evenly distributed resin throughout the mold cavity. The extremely small size of these reinforcing particles permits them to fill thin mold cavity areas less than 1/10 inch thick without impairing resin flow. A reduction to near elimination of unreinforced protrusions occurs in the final molded product, accordingly.

In addition to reinforcing agents, other additives may optionally be included in the polymer composition to improve processability. For example, aging modifiers, such as glycerol monostearate, are useful additives in polymer compositions for molding. Aging modifiers are typically present in an amount from about 0.5% to about 5% thermoplastic resin. Release agents may also be present to enhance removal of the final product from the mold. Other additives include pigments, heat stabilizers, antioxidants, flame retardants, ultraviolet absorbing agents and the like.

Reinforced articles of the invention exhibit improved properties over non-reinforced articles. For example, polyethylene articles having about 5% nanoparticles by volume, wherein 90% of the particles have 5 or fewer layers, increased flexural modulus by 2.5 to about 3 times over compositions lacking reinforcing nanoparticles, as measured under ASTM D790 test conditions. This 5% nanoparticle polyethylene article exhibited >200% elongation to rupture. By contrast, about 25% glass fiber reinforcement is required in such articles to achieve an equivalent modulus. Polypropylene articles according to the invention showed about a 60% improvement in flexural modulus over articles lacking reinforcement nanoparticles. Thus, the use of reinforcing nanoparticles according to the invention provides articles having good flexural stiffness.

Figure 4:
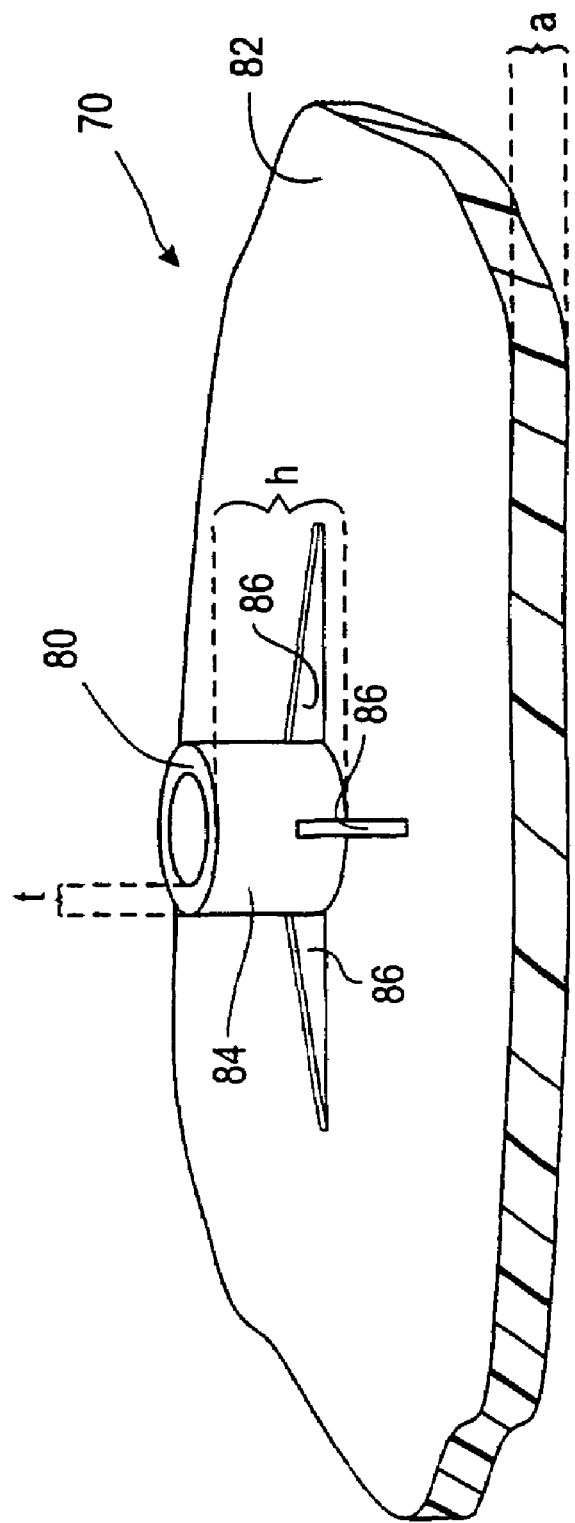
FIG. 4. Is a perspective view, partly in cross-section, of another embodiment of a reinforced article manufactured in accordance with the principles of the present invention.

FIG. 4 is a partial perspective view, partly in section, and illustrating another application of the present invention. Specifically, FIG. 4 illustrates and article 70 having projections forming a boss 80. The article 70 may be a panel 10 as illustrated in FIG. 1, and boss 80 may be one of the bosses 16 illustrated in FIG. 1. The boss 80 is formed on a main portion 82 and defines a hole through the article 70. The protrusion 80 is integrally compression molded with main portion 82. The protrusion includes a cylindrical wall portion 84 and a plurality of radially projecting support ribs 86. The wall thickness of the projections is less than 0.1". For example, the wall thickness (t) of the cylindrical wall portion 84 is less than 0.1". The cylindrical wall portion 84 has a height (h) of at least twice the thickness (t). The height (h) is at least twice the thickness (a) of the main portion 82. The article 70 is compression molded from the same material specified with respect to the previous embodiment. The boss 80 is constructed and arranged to receive a fastener therethrough to fix a structure to article 70.

Figure 5:
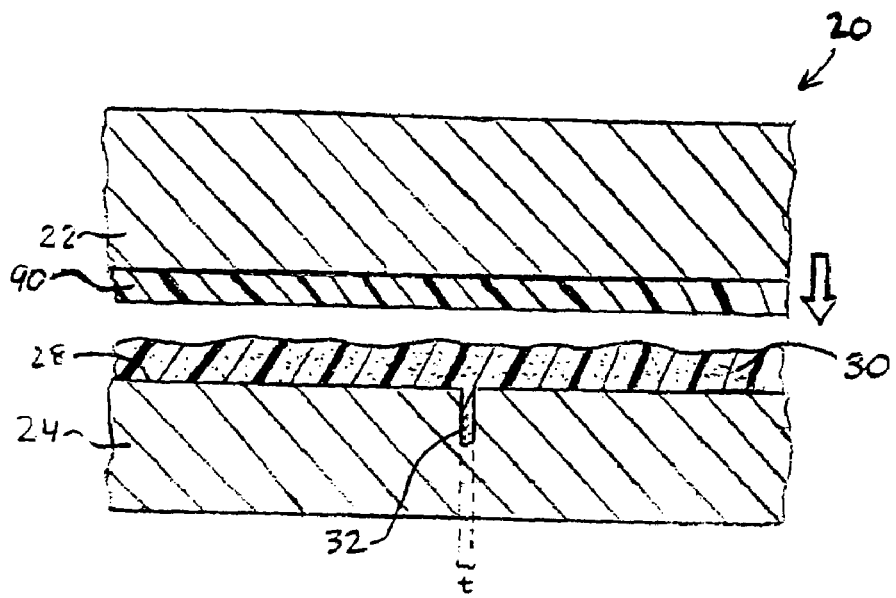
FIG. 5 is a cross sectional view of a compression molding die assembly used in accordance with another embodiment of the method of the present invention.

FIG. 5 illustrates another embodiment of the method in accordance with the present invention. In FIG. 5, a decorative material 90 is placed between the first die structure 22 and the second die structure 24 before the hot melt material 30 is introduced into the die cavity. The hot melt is then injected or poured onto the surface of the decorative material 90 and adhered thereto as a result of the curing process. In one embodiment the decorative material 90 is selected from flexible materials, that are calendared or embossed to provide a leather-like appearance. In such an embodiment, it is preferred that the decorative material be selected from a group consisting of vinyl, polyvinylchloride/acrylonitrile, butadiene, styrene (PVC/ABS), thermoplastic polyolefins (TPO), polypropelene (PP), and thermoplastic polyurethanes (TPU).

Figure 6:
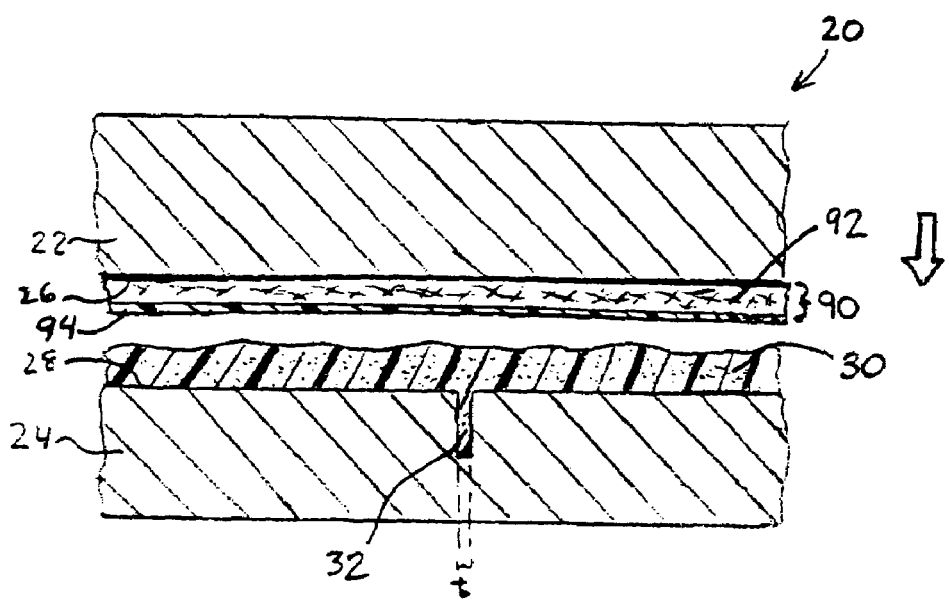
FIG. 6 is a cross sectional view of a compression molding die assembly used in accordance with another embodiment of the method of the present invention.

FIG. 6 illustrates yet another embodiment of the method in accordance with the present invention. In FIG. 6, a decorative material 90 is again placed between the first die structure 22 and the second die structure 24 before the hot melt material 30 is introduced into the die cavity. The hot melt is then injected or poured onto the surface of the decorative material 90 and adhered thereto as a result of the curing process. In this embodiment, the decorative material comprises a fabric, cloth, or carpeting layer 92 as an aesthetically appealing skin for the interior of the vehicle. The decorative material 90 further includes a second layer 94 which is a bonded foam layer and/or a film layer that provide a semi-soft feel and to keep molten plastic from penetrating into the fabric, cloth or carpeting layer 92.

It should be appreciated that the foregoing description is illustrative in nature and that the present invention includes modifications, changes, and equivalents thereof, without departure from the scope of the invention.

What is claimed is:

1. A reinforced low pressure compression molded article comprising:

a main portion having opposing major surfaces defining a thickness of said main portion; and a protrusion integrally molded with said main portion and protruding from one of said surfaces, said protrusion having a thickness of less than the thickness of said main portion and less than about 0.1", said protrusion having a height of at least twice the thickness of said protrusion, said main portion and said protrusion being formed from a material comprising at least one thermoplastic, and reinforcing particles, the reinforcing particles comprise about 2% to about 15%, by volume, of a total volume of the material, said reinforcing particles each comprising one or more layers, at least 50% of said reinforcing particles being less than about 20 layers thick, at least 99% of said reinforcing particles being less than about 30 layers thick, said layers comprising platelets having a thickness of between about 0.7 nm and 1.2 nm, and wherein at least some of the reinforcing particles are not completely exfoliated and are about 20 to 30 layers thick.

2. A reinforced low pressure compression molded article according to claim 1, further comprising a decorative material adhered to an opposite surface disposed on a side of said main portion opposite said one of said surfaces.

3. A reinforced low pressure compression molded article according to claim 2, wherein said decorative material is made from a material selected from a group consisting of vinyl, poly(vinyl chloride)/acrylonitrile butadiene styrene, thermoplastic olefin, polypropylene, and thermoplastic polyurethane.

4. A reinforced low pressure compression molded article according to claim 2, wherein said decorative material is made from fabric, or carpeting.

5. A reinforced low pressure compression molded article according to claim 4, wherein said decorative material further includes at least one of a bonded foam layer and a film layer disposed in contact with said opposite surface.

* * * * *